US006968962B2

(12) United States Patent
Toma (10) Patent No.: US 6,968,962 B2
(45) Date of Patent: *Nov. 29, 2005

(54) FRAME KIT AND METHODS THEREFOR (76) Inventor: Dennis R. Toma, 9811 W. Charleston Blvd. Suite 2343, Las Vegas, NV (US) 89117

( * ) Notice: Subject to any disclaimer, the term of this patent is extended or adjusted under 35 U.S.C. 154(b) by 0 days.

This patent is subject to a terminal disclaimer.

(21) Appl. No.: 11/029,741

(22) Filed: Jan. 4, 2005

(65) Prior Publication Data

US 2005/0115913 A1 Jun. 2, 2005

Related U.S. Application Data (63) Continuation-in-part of application No. 10/361,403, filed on Feb. 10, 2003.

(51) Int. Cl.[7] ................................................ A47F 5/14
(52) U.S. Cl. ...................... 211/182; 312/265.1; 211/189
(58) Field of Search ................................. 211/182, 189; 312/265.1, 265.4; 403/170, 171, 173, 176, 403/403, 382, 230, 231, 187, 188

(56) References Cited

U.S. PATENT DOCUMENTS

| 3,695,649 | A | * | 10/1972 | Laverone | 403/231 |
|---|---|---|---|---|---|
| 4,455,102 | A | * | 6/1984 | Baroi et al. | 403/173 |
| 4,493,425 | A | * | 1/1985 | Yoshida | 211/189 |
| 4,610,561 | A | * | 9/1986 | Cecchellero et al. | 403/171 |
| 4,678,359 | A | * | 7/1987 | Keen | 403/170 |
| 4,712,942 | A | * | 12/1987 | Brown | 403/174 |
| 5,013,176 | A | * | 5/1991 | Orbom | 403/171 |
| 5,116,161 | A | * | 5/1992 | Faisst | 403/231 |
| 5,399,044 | A | * | 3/1995 | Gilb | 403/231 |
| 5,425,203 | A | * | 6/1995 | Scott | 47/70 |
| 5,498,099 | A | * | 3/1996 | Scheuer | 403/403 |
| 5,516,225 | A | * | 5/1996 | Kvols | 403/170 |
| 5,692,333 | A | * | 12/1997 | McClave | 40/785 |
| 5,732,496 | A | * | 3/1998 | Tanaka | 40/784 |
| 5,799,430 | A | * | 9/1998 | Fremstad | 40/785 |
| 5,918,998 | A | * | 7/1999 | Pourmand | 403/218 |
| 5,927,893 | A | * | 7/1999 | Imamura et al. | 403/270 |
| 6,089,778 | A | * | 7/2000 | Hirano et al. | 403/231 |
| 6,179,398 | B1 | * | 1/2001 | Martin | 312/265.4 |
| 6,591,571 | B2 | * | 7/2003 | Fritsche et al. | 52/655.1 |
| 6,682,256 | B1 | * | 1/2004 | Hor | 403/382 |
| 6,786,337 | B2 | * | 9/2004 | Klein et al. | 211/34 |
| 2001/0006163 | A1 | * | 7/2001 | Scudeller | 211/182 |
| 2002/0006312 | A1 | * | 1/2002 | Buard | 403/403 |
| 2003/0223810 | A1 | * | 12/2003 | Jadaud et al. | 403/382 |

* cited by examiner

Primary Examiner—Jennifer E. Novosad
(74) Attorney, Agent, or Firm—Harry M. Weiss; Weiss, Moy & Harris, P.C.

(57) ABSTRACT

A frame kit comprises a plurality of improved corner connectors and a plurality of rail members both having a plurality of holes, a plurality of fasteners for coupling each one of the corner connectors to one end of three rail members of the plurality of rail members and at least one set of instructions located in at least one container suitable for constructing at least one frame assembly. The frame kit may also comprise at least one of a plurality of leveling feet, a plurality of casters adapted for coupling to a portion of at least one of the corner connectors, a plurality of rib members for strengthening at least one frame assembly and a plurality of accessory members adapted to couple to at least one of the plurality of rail members. A method for assembling the frame kit and constructing at least one frame assembly is also disclosed.

18 Claims, 4 Drawing Sheets

FRAME KIT AND METHODS THEREFOR

CROSS-REFERENCE TO RELATED APPLICATION

This application is a Continuation in Part of U.S. application Ser. No. 10/361,403, filed Feb. 10, 2003 (published as U.S. Publication No. 2004/0155002 A1), entitled: Connecting Corner for Knock Down Racks in the name of the same Applicant.

FIELD OF THE INVENTION

This invention relates generally to frame kits and more specifically to a frame kit comprising at least a plurality of improved connecting corners, a plurality of rail members and a plurality of fasteners.

BACKGROUND OF THE INVENTION

Various manufacturers have provided equipment frame assemblies and equipment enclosures for storing electronic equipment. Most such enclosures and frame assemblies were supplied by these manufacturers in a fully assembled state and therefore required customization to comply with the needs of consumers. Consequently, costs for such enclosures were relatively high, and in an after-market sense, modification of such enclosures by consumers was difficult to achieve. Additionally the cost of shipping such enclosures was high because of the size of such enclosures.

Subsequently, certain knock-down components were offered in the market, which required tedious construction and specialized hardware and tools for constructing the knock-down components into a full enclosure. Amongst limitations that exist for such knock-down components are: standardization in sizes, custom ordering for non-standard sized enclosures, assortment of parts needed for construction of the enclosure, time to construct the enclosure and strength considerations of the components and final enclosure.

The present inventor recognized the need for an improved system for constructing enclosures (otherwise termed frame assemblies in this application), and previously disclosed improved corner connectors for knock-down racks (U.S. application Ser. No. 10/361,403, filed Feb. 10, 2003). Subsequently, the present inventor has recognized an advantage in providing such improved corner connectors (otherwise termed corner members in this application) in combination with rail members and fasteners in a kit form which may be easily transported and which provides all elements necessary for simple construction of a frame assembly, as well as other similar assemblies that make use of the improved corner connectors, rail members and fasteners as base elements of structures.

SUMMARY OF THE INVENTION

Accordingly, it is an object of this disclosure to provide a plurality of improved corner members, a plurality of rail members and a plurality of fasteners in a kit form for construction of a frame assembly.

It is a further object of this disclosure to provide a plurality of improved corner members, a plurality of rail members and a plurality of fasteners in a kit form for construction of a multiple frame assembly.

It is a still further object of this disclosure to provide a plurality of improved corner members, a plurality of rail members and a plurality of fasteners in a kit form for simple construction of a variety of enclosures.

It is a yet further object of this disclosure to provide a method for assembling a frame kit as described above.

It is a further object of this disclosure to provide a method for constructing a frame assembly from a frame kit as described above.

PREFERRED EMBODIMENTS OF THE INVENTION

In accordance with one embodiment of this invention, a frame kit is disclosed. The frame kit comprises, in combination a plurality of rail members, each one of the rail members having a plurality of holes and a plurality of corner connectors, each one of the plurality of corner connectors including a base member having a plurality of holes and a reinforcing rib coupled to the base member, a pair of leg members, each having a plurality of holes, each one of the pair of leg members including a reinforcing rib coupled to each one of the pair of leg members, a first leg member of the pair of leg members substantially perpendicular to a second leg member of the pair of leg members, each one of the pair of leg members substantially perpendicular to the base member, a portion of the base member and a portion of the first leg member of the pair of leg members having a first inner slot, a portion of the base member and a portion of the second leg member of the pair of leg members having a second inner slot, a portion of the first leg member and a portion of the second leg member having a third inner slot, and a portion of the base member including a rail stop adjacent to a portion of each one of the pair of leg members. The first inner slot of each one of the plurality of corner connectors receives one end of a first rail member of the plurality of rail members, the second inner slot of each one of the plurality of corner connectors receives one end of a second rail member of the plurality of rail members and the third inner slot of each one of the plurality of corner connectors receives one end of a third rail member of the plurality of rail members, the rail stop prevents contact of the one end of the first rail member with both the one end of the second rail member and the one end of the third rail member. The frame kit further comprises, in combination a plurality of fasteners adapted to selectively couple each one of the plurality of rail members to the base member and to each one of the pair of leg members of each one of the plurality of corner connectors thereby providing at least a portion of a frame assembly, and at least one container, the plurality of corner members, the plurality of rail members and the plurality of fasteners located in the at least one container thereby providing the frame kit.

In accordance with a second embodiment of this invention, a method for assembling a frame kit is disclosed. The method for assembling a frame kit comprises the steps of providing a plurality of rail members, each one of the rail members having a plurality of holes and providing a plurality of corner connectors, each one of the plurality of corner connectors including a base member having a plurality of holes and a reinforcing rib coupled to the base member, a pair of leg members, each having a plurality of holes, each one of the pair of leg members including a reinforcing rib coupled to each one of the pair of leg members, a first leg member of the pair of leg members substantially perpendicular to a second leg member of the pair of leg members, each one of the pair of leg members substantially perpendicular to the base member, a portion of the base member and a portion of the first leg member of the pair of leg members having a first inner slot, a portion of the base member and a portion of the second leg member of the pair of leg members having a second inner slot, a portion of the first leg member and a portion of the second leg member having a third inner slot, and a portion of the base member including a rail stop adjacent to a portion of each one of the pair of leg members. The method further comprises the steps of providing the first inner slot of each one of the plurality of corner connectors receives one end of a first rail member of the plurality of rail members, the second inner slot of each one of the plurality of corner connectors receives one end of a second rail member of the plurality of rail members and the third inner slot of each one of the plurality of corner connectors receives one end of a third rail member of the plurality of rail members, the rail stop preventing contact of the one end of the first rail member with both the one end of the second rail member and the one end of the third rail member and providing a plurality of fasteners adapted to selectively couple each one of the plurality of rail members to the base member and to each one of the pair of leg members of each one of the plurality of corner connectors thereby providing at least a portion of at least one frame assembly. The method further comprises the steps of providing at least one container and locating the plurality of corner members, the plurality of rail members and the plurality of fasteners in the at least one container thereby providing the frame kit in preparation for constructing the at least one frame assembly.

In accordance with a third embodiment of this invention, a method for constructing a frame assembly from a frame kit is disclosed. The method comprises the steps of providing the frame kit comprising a plurality of rail members, each one of the rail members having a plurality of holes and providing the frame kit further comprising a plurality of corner connectors, each one of the plurality of corner connectors including a base member having a plurality of holes and a reinforcing rib coupled to the base member, a pair of leg members, each having a plurality of holes, each one of the pair of leg members including a reinforcing rib coupled to each one of the pair of leg members, a first leg member of the pair of leg members substantially perpendicular to a second leg member of the pair of leg members, each one of the pair of leg members substantially perpendicular to the base member, a portion of the base member and a portion of the first leg member of the pair of leg members having a first inner slot, a portion of the base member and a portion of the second leg member of the pair of leg members having a second inner slot, a portion of the first leg member and a portion of the second leg member having a third inner slot, and a portion of the base member including a rail stop adjacent to a portion of each one of the pair of leg members. The method further comprises the steps of providing the frame kit further comprising the first inner slot of each one of the plurality of corner connectors receives one end of a first rail member of the plurality of rail members, the second inner slot of each one of the plurality of corner connectors receives one end of a second rail member of the plurality of rail members and the third inner slot of each one of the plurality of corner connectors receives one end of a third rail member of the plurality of rail members, the rail stop preventing contact of the one end of the first rail member with both the one end of the second rail member and the one end of the third rail member and providing the frame kit further comprising a plurality of fasteners adapted to selectively couple each one of the plurality of rail members to the base member and to each one of the pair of leg members of each one of the plurality of corner connectors thereby providing at least a portion of at least one frame assembly. The method further comprises the steps of providing the frame kit comprising at least one container housing the plurality of corner members, the plurality of rail members, the plurality of fasteners and at least one set of instructions for constructing the at least one frame assembly, unpacking the plurality of corner members, the plurality of rail members, the plurality of fasteners and the one set of instructions from the at least one container and constructing the at least one frame assembly according to the at least one set of instructions.

The foregoing and other objects, features, and advantages of the invention will be apparent from the following, more detailed description of the preferred embodiments of the invention, as illustrated in the accompanying drawings.

DESCRIPTION OF THE INVENTION

Figure 2:
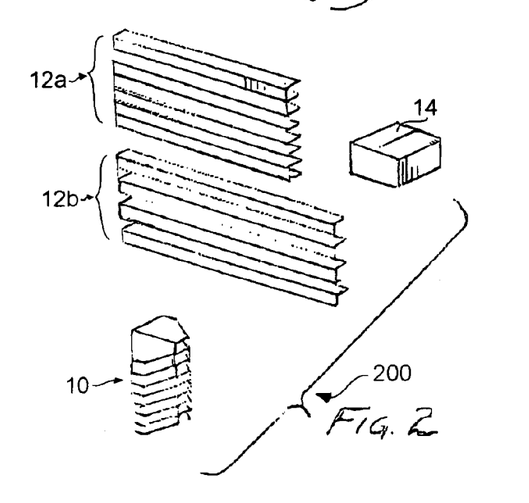
FIG. 2 is a perspective view of a portion of a second embodiment of a frame kit comprising a plurality of corner connectors, a plurality of rail members with a first set of the plurality of rail members being of different length to a second set of the plurality of rail members and a first container including a plurality of fasteners (not shown) suitable for being located in the second container of FIG. 1 according to the present invention.
Figure 3:
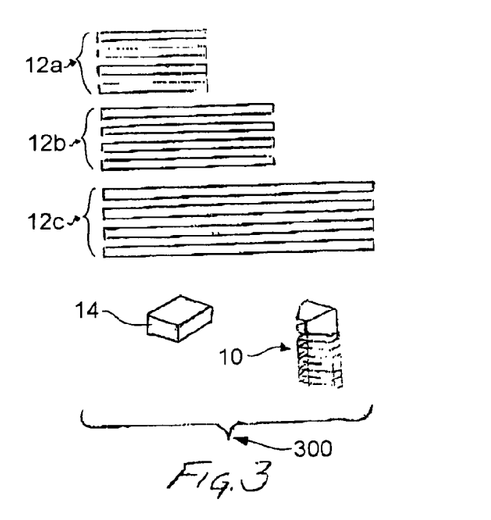
FIG. 3 is a perspective view of a portion of a third embodiment of a frame kit comprising a plurality of corner connectors, a plurality of rail members with a first set of the plurality of rail members being of different length to a second set of the plurality of rail members and a third set of the plurality of rail members being of different length to both the first set of the plurality of rail members and the second set of the plurality of rail members and a first container including a plurality of fasteners (not shown) suitable for being located in the second container of FIG. 1 according to the present invention.

The disclosure of U.S. application Ser. No. 10/361,403 in the name of the current inventor, filed Feb. 10, 2003 (published as U.S. Publication No. 2004/0155002 A1) is incorporated by reference in the current application. According to FIG. 1, in one embodiment of a frame kit 100, the frame kit 100 comprising a plurality of corner connectors 10, a plurality of rail members 12 having the same length, a first container 14 including a plurality of fasteners 16, at least one set of instructions 18 and a second container 20 with each one of the plurality of corner connectors 10, the plurality of rail members 12, the first container 14 including the plurality of fasteners 16 and the at least one set of instructions 18 is located in the second container 20. Referring to FIG. 2, in a second embodiment of a frame kit 200, a portion of the frame kit 200 comprising a plurality of corner connectors 10, a plurality of rail members 12 with a first set of the plurality of rail members 12a being of different length to a second set of the plurality of rail members 12b and a first container 14 including a plurality of fasteners 16 (not shown) is suitable for being located in the second container 20 of FIG. 1. Referring further to FIG. 3, in a third embodiment of a frame kit 300, a portion of the frame kit 300 comprising a plurality of corner connectors 10, a plurality of rail members 12 with a first set of the plurality of rail members 12a being of different length to a second set of the plurality of rail members 12b and a third set of the plurality of rail members 12c being of different length to both the first set of the plurality of rail members 12a and the second set of the plurality of rail members 12b and a first container 14 including a plurality of fasteners 16 (not shown) is suitable for being located in the second container 20 of FIG. 1. It is understood that in each embodiment of the frame kit 100, 200 and 300 described above, the second container 20 may be suitably sized to accommodate the plurality of corner connectors 10, the plurality of rail members 12, the first container 14 including the plurality of fasteners 16 and the at least one set of instructions 18. It is further understood that the first container 14 may comprise any suitable packaging such as a cardboard box, at least one plastic bag and the like suitable for enclosing the plurality of fasteners 16, or alternatively, the plurality of fasteners 16 may also be loosely included in the second container 20. Furthermore, it is understood that the second container 20 may also be any suitable packing such as a cardboard box, at least one plastic bag and the like suitable for enclosing the plurality of corner connectors 10, the plurality of rail members 12, the first container 14 including the plurality of fasteners 16 and the at least one set of instructions 18 as described above.

Figure 4:
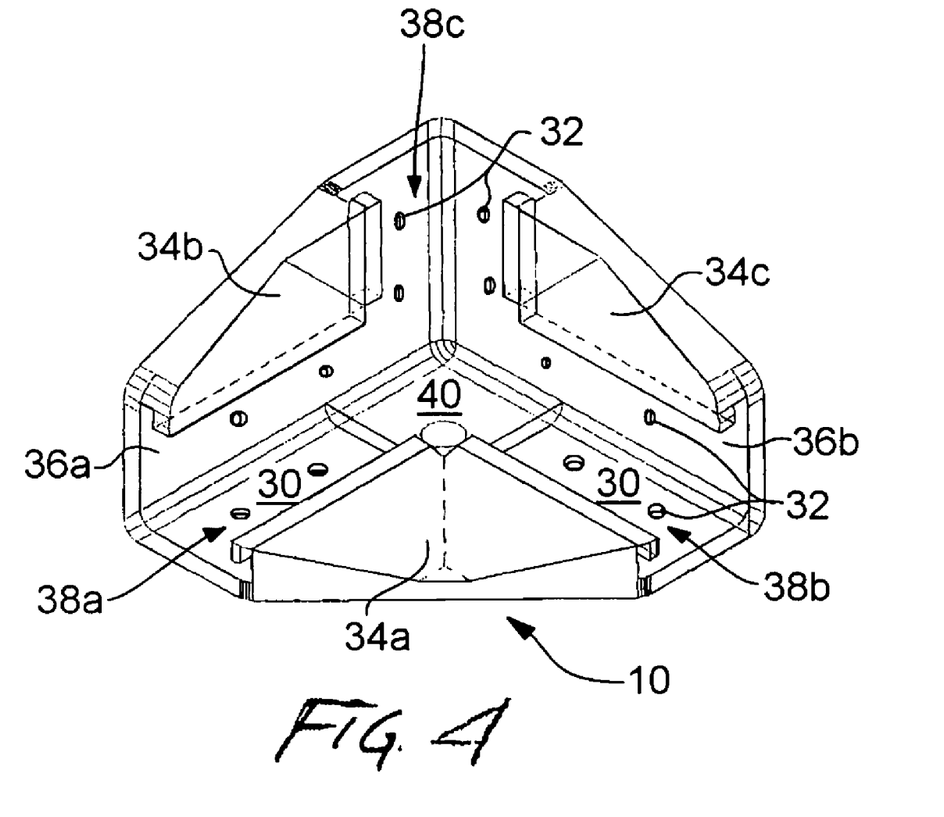
FIG. 4 is a perspective view showing an exploded view of an inner portion of one corner connector of the plurality of corner connectors of FIG. 1.
Figure 5:
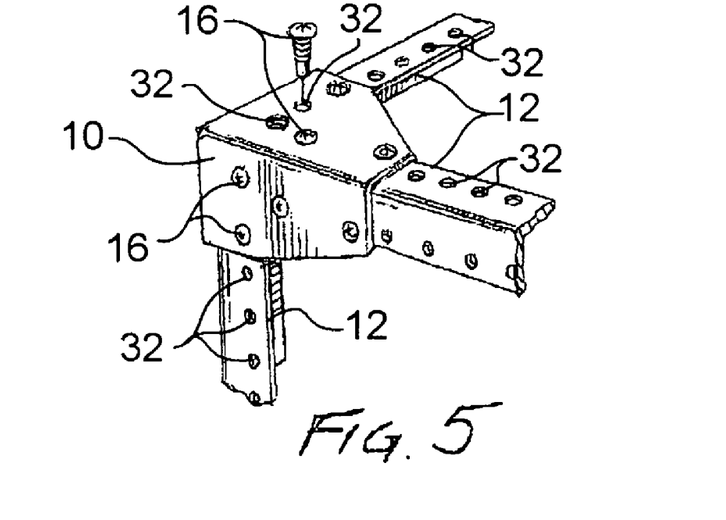
FIG. 5 is a perspective view showing an exploded view of an outer portion of one corner connector of the plurality of corner connectors of FIG. 1 coupled to three rail members of the plurality of rail members of FIG. 1 by a plurality of fasteners of FIG. 1.

According to FIG. 4, as previously disclosed in U.S. Publication No. 2004/0155002 A1, each corner connector 10 of the plurality of corner connectors 10 includes a base member 30 having a plurality of holes 32 (see also FIG. 5) and a reinforcing rib 34a coupled to the base member 30, a pair of leg members 36, each having a plurality of holes 32, each one of the pair of leg members 36 including each one of a reinforcing rib 34b, 34c coupled to the pair of leg members 36 respectively, a first leg member 36a of the pair of leg members 36 substantially perpendicular to a second leg member 36b of the pair of leg members 36, each one of the pair of leg members 36 substantially perpendicular to the base member 32, a portion of the base member 32 and a portion of the first leg member 36a of the pair of leg members 36 defining a first inner slot 38a, a portion of the base member 32 and a portion of the second leg member of the pair of leg members 36 defining a second inner slot 38b, a portion of the first leg member 36a and a portion of the second leg member 36b defining a third inner slot 38c, and a portion of the base member 32 including a rail stop 40 adjacent to a portion of each one of the pair of leg members 36. It is understood that when the base member 30 of each one of the plurality of corner connectors 10 includes the reinforcing rib 34a coupled to a portion of the base member 30 and each one of the pair of leg members 36 of each one of the plurality of corner connectors 10 includes a reinforcing rib 34b, 34c coupled to a portion of each one of the pair of leg members 36a, 36b each one of the plurality of corner connectors 10 is thereby strengthened. Furthermore referring to FIG. 5, in each corner connector 10, the first inner slot 38a of each one of the plurality of corner connectors 10 receives one end of a first rail member 12 of the plurality of rail members 12, the second inner slot 38b of each one of the plurality of corner connectors 10 receives one end of a second rail member 12 of the plurality of rail members 12 and the third inner slot 38c of each one of the plurality of corner connectors 10 receives one end of a third rail member 12 of the plurality of rail members 12, the rail stop 40 preventing contact of the one end of the first rail member 12 with both the one end of the second rail member 12 and the one end of the third rail member 12. As further shown in FIG. 5, each one of the rail members 12 of the plurality of rail members 12 having a plurality of holes 32 and the plurality of fasteners 16 is adapted to selectively couple each one of the plurality of rail members 12 to the base member 30 and to each one of the pair of leg members 36 of each one of the plurality of corner connectors 10 thereby providing at least a portion of any one of a frame assembly 100a, 200a and 300a as described below. Preferably each one of the plurality of corner connectors 10 comprises a material selected from the group consisting of a metal, a plastic and a fiber reinforced plastic and more preferably the metal is aluminum. Preferably, as previously disclosed in U.S. Publication No. 2004/0155002 A1, both the plurality of holes 32 of the base member 30 and the plurality of holes 32 of the pair of leg members 36a, 36b of each one of the plurality of corner connectors 10 has a counter sunk shape to accommodate a head portion of each one of the plurality of fasteners 16. In addition, preferably each one of the plurality of rail members 12 is substantially L-shaped and thereby adapted to conform to each one of the inner slots 38a, 38b, 38c of each one of the plurality of corner connectors 10.

Figure 1:
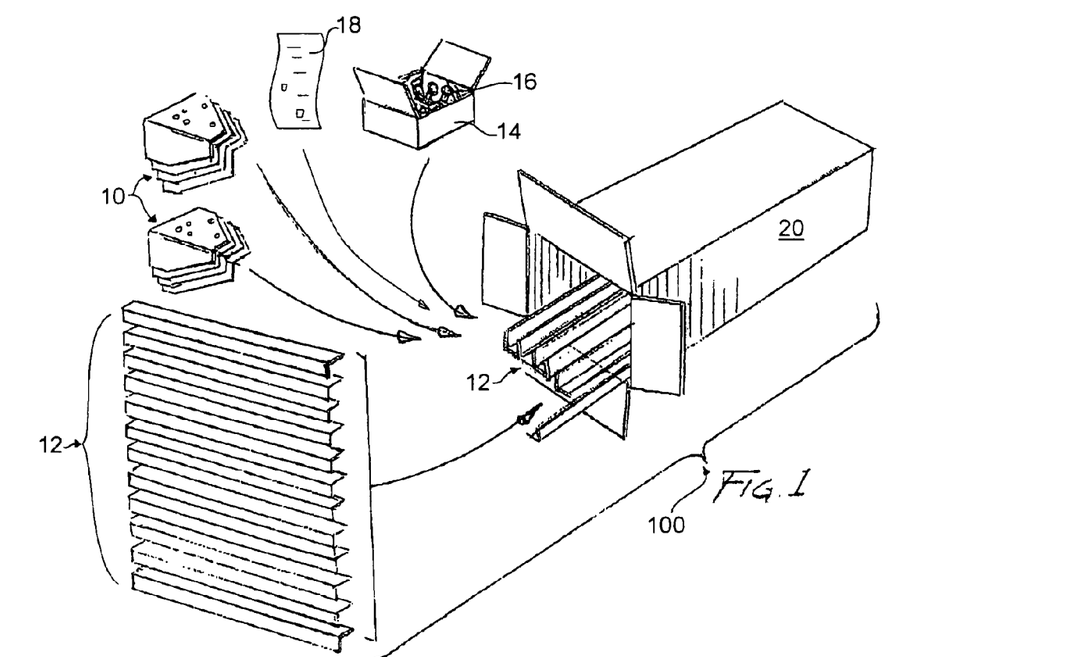
FIG. 1 is a perspective view of a first embodiment of a frame kit comprising a plurality of corner connectors, a plurality of rail members having the same length, a first container including a plurality of fasteners, a set of instructions and a second container, with each one of the plurality of corner connectors, the plurality of rail members, the first container including the plurality of fasteners and the set of instructions being located in the second container according to the present invention.
Figure 6:
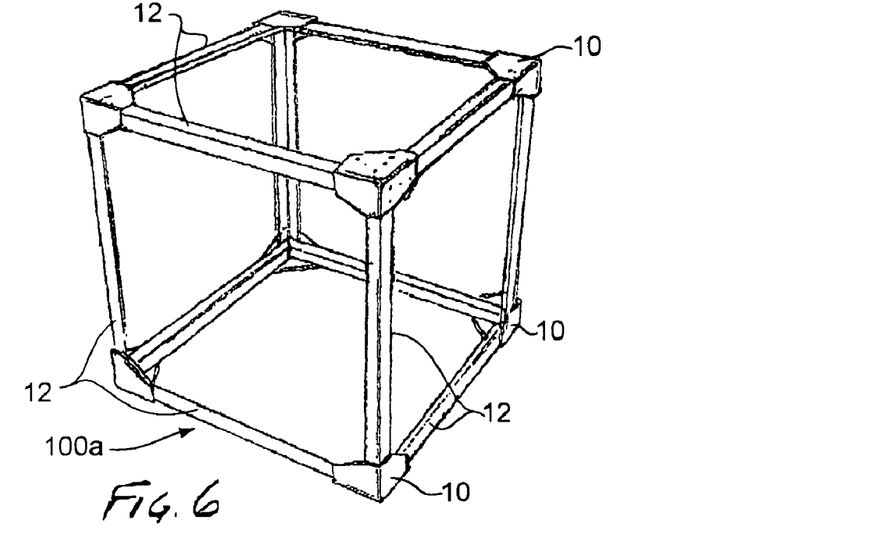
FIG. 6 is a perspective view showing a frame assembly having the plurality of corner connecters of FIG. 1 and the plurality of rail members each rail member having the same length of FIG. 1, with the frame assembly having a substantially cube shape according to the first embodiment of the frame kit of FIG. 1.

Turning now to FIG. 6, a perspective view of a frame assembly 100a is shown having the plurality of corner connecters 10 of FIG. 1 and the plurality of rail members 12, each rail member 12 having the same length with the frame assembly 100a having a substantially cube shape. Specifically, the frame assembly 100a is constructed from the frame kit 100 of FIG. 1 and comprises each one of the at least twelve rail members 12 of the plurality of rail members 12 having the same length thereby providing a cube shaped frame assembly 100a. The frame assembly 100a comprises at least eight corner connectors 10 of the plurality of corner connectors 10 and the plurality of fasteners 16. In a preferred embodiment at least ninety-six fasteners are used, although it is understood that less than this number of fasteners may also be effective. It is understood that the frame assembly 100a may be sized as required by a user of the frame assembly 100a.

Figures 7, 8:
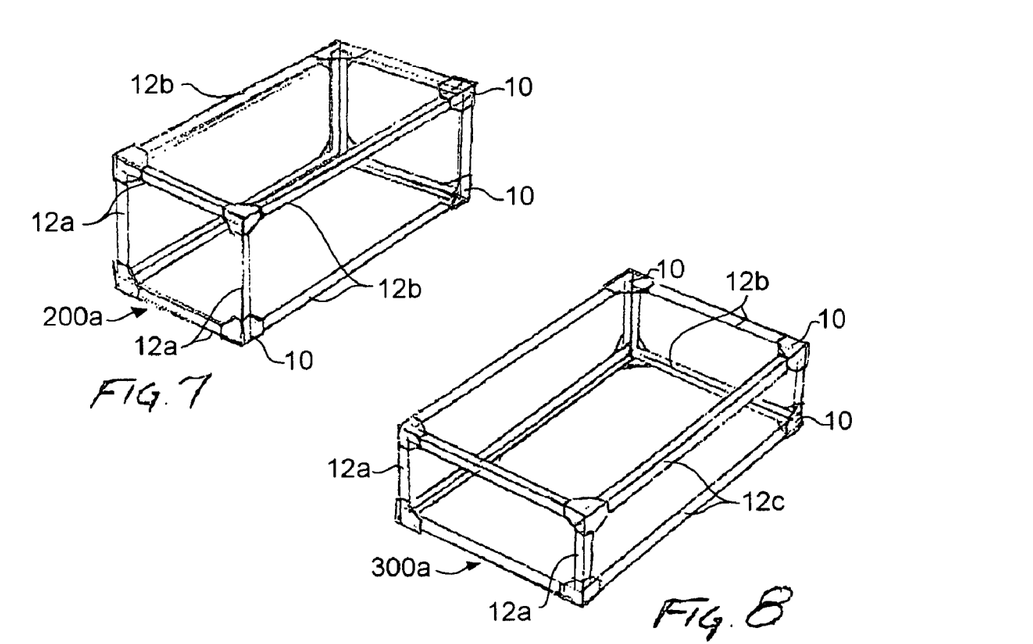
FIG. 7 is a perspective view showing a frame assembly having the plurality of corner connecters of FIG. 2 and the plurality of rail members with a first set of four rail members having the same length and a second set of eight rail members having the same length, but of different length to the first set of rail members of FIG. 2 and the frame assembly having a substantially rectangular prismatic shape according to the second embodiment of the frame kit of FIG. 2.
FIG. 8 is a perspective view showing a frame assembly having the plurality of corner connecters of FIG. 3 and the plurality of rail members with a first set of four rail members having the same length, a second set of four rail members having the same length, and a third set of rail members having the same length but the first set of rail members, the second set of rail members and the third set of rail members having different lengths of FIG. 3 and the frame assembly having a substantially rectangular prismatic shape according to the third embodiment of the frame kit of FIG. 3.

Referring to FIG. 7, a perspective view of a frame assembly 200a is shown having the plurality of corner connecters 10 of FIG. 2 and the plurality of rail members 12 with a first set of four rail members 12a having the same length and a second set of eight rail members 12b having the same length, but of different length to the first set of rail members 12a of FIG. 2 and the frame assembly 200a having a substantially rectangular prismatic shape. Specifically, the frame assembly 200a is constructed from the frame kit 200 of FIG. 2, each one of a first set of four rail members 12a of the twelve rail members 12 having the same length and each one of a second set of eight rail members 12b of the twelve rail members 12 having the same length, the first set of the twelve rail members 12a being of different length to the second set of the twelve rail members 12b thereby providing a rectangular prismatic shaped frame assembly 200a. The frame assembly 200a comprises at least eight corner connectors 10 of the plurality of corner connectors 10 and the plurality of fasteners 16. In a preferred embodiment at least ninety-six fasteners are used, although it is understood that less than this number of fasteners may also be effective. It is understood that the frame assembly 200a may be sized as required by a user of the frame assembly 200a.

Referring now to FIG. 8, a perspective view of a frame assembly 300a is shown having the plurality of corner connecters 10 of FIG. 3 and the plurality of rail members 12 with a first set of four rail members 12a having the same length, a second set of four rail members 12b having the same length, and a third set of rail members 12c having the same length but the first set of rail members 12a, the second set of rail members 12b and the third set of rail members 12c having different lengths and the frame assembly 300a having a substantially rectangular prismatic shape. Specifically, the frame assembly 300a is constructed from the frame kit 300 of FIG. 3, each one of a first set of four rail members 12a of the twelve rail members 12 having the same length, each one of a second set of four rail members 12b of the twelve rail members 12 having the same length and a third set of four rail members 12c of the twelve rail members 12 having the same length, the first set of the twelve rail members 12a being of different length to the second set of the twelve rail members 12b, and the third set of the twelve rail members 12c being of different length to both the first set of four rail members 12a and the second set of four rail members 12b thereby providing a rectangular prismatic shaped frame assembly 300a. The frame assembly 300a comprises at least eight corner connectors 10 of the plurality of corner connectors 10 and the plurality of fasteners 16. In a preferred embodiment at least ninety-six fasteners are used, although it is understood that less than this number of fasteners may also be effective. It is understood that the frame assembly 300a may be sized as required by a user of the frame assembly 300a.

Figures 9, 9A, 9B, 10:
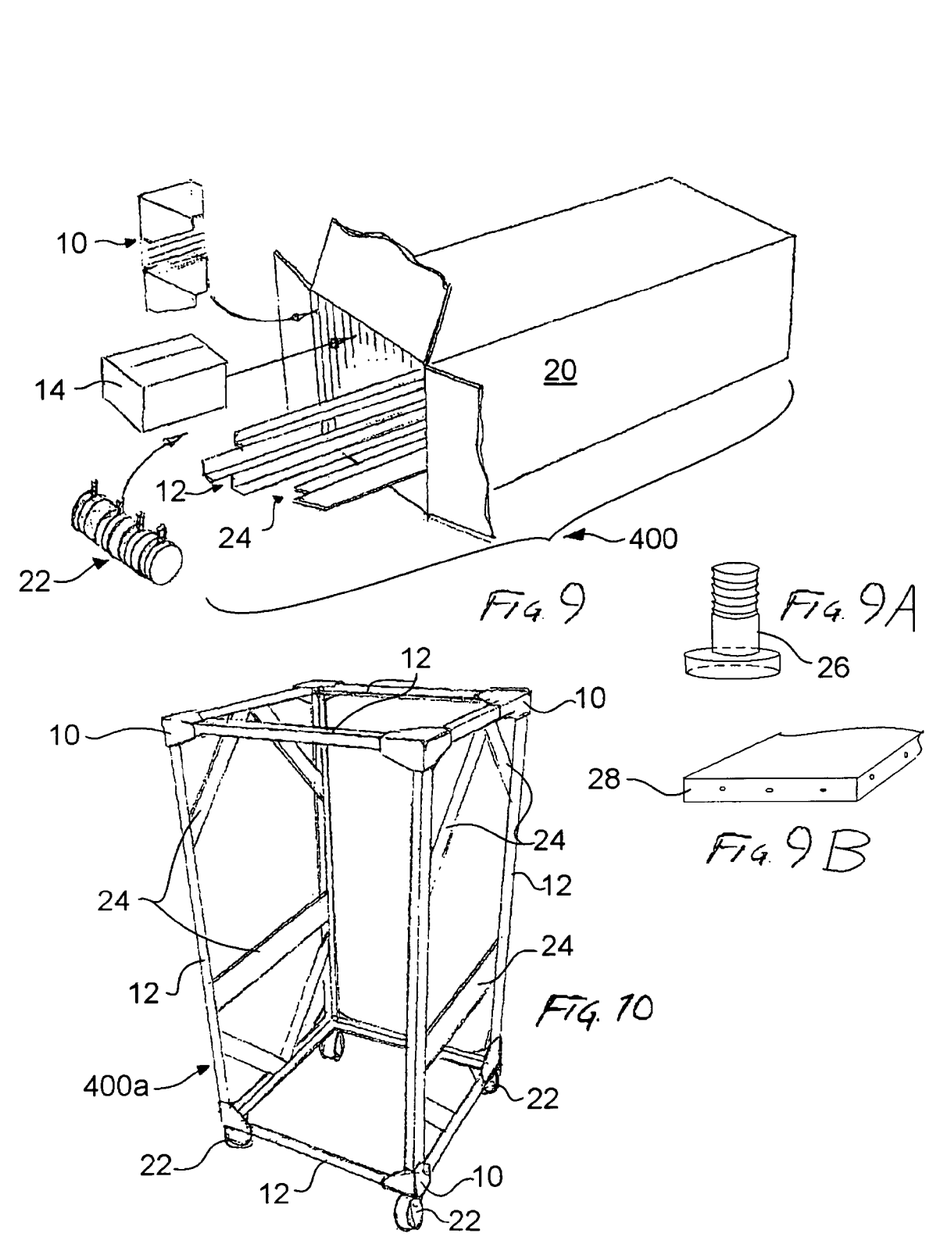
FIG. 9 is a perspective view of a fourth embodiment of a frame kit comprising each one of a plurality of corner connectors, a plurality of rail members, a plurality of reinforcing members, a plurality of casters and a first container including a plurality of fasteners (not shown) suitable for being located in a second container similar to the second container of FIG. 1 according to the present invention.
FIG. 9A is a perspective view of at least one leveling foot of a plurality of leveling feet.
FIG. 9B is a perspective view of a portion of at least one accessory member of a plurality of accessory members.
FIG. 10 is a perspective view showing a frame assembly having the plurality of corner connecters of FIG. 9, the plurality of rail members of FIG. 9, the plurality of reinforcing members of FIG. 9 coupled to a portion of the plurality of rail members, and each one of four casters of the plurality of casters of FIG. 9 coupled to each one of four corner connectors of the plurality of corner connectors according to the fourth embodiment of the frame kit of FIG. 9.

According to FIG. 9 in a fourth embodiment of a frame kit 400, the frame kit 400 comprising each one of a plurality of corner connectors 10, a plurality of rail members 12, a plurality of reinforcing members 24, a plurality of casters 22 and a first container 14 including a plurality of fasteners 16 (not shown) is suitable for being located in a second container 20 similar to the second container 20 of FIG. 1. It is understood that in the fourth embodiment of the frame kit 400 described above, the second container 20 may be suitably sized to accommodate the plurality of corner connectors 10, the plurality of rail members 12, the plurality of reinforcing members 24, the plurality of casters 22, the first container 14 including the plurality of fasteners 16 and at least one set of instructions 18 (not shown in FIG. 9, but shown in FIG. 1). Referring to FIGS. 9A and 9B and previously disclosed U.S. Publication No. 2004/0155002 A1, the base member 30 of each one of the plurality of corner connectors 10 may have at least one threaded hole and the base member 30 of each one of the plurality of corner connectors 10 is selectively coupled to one of a leveling foot 26, a caster 22 and an accessory member 28. It is understood that any one of the frame kits 100, 200 and 300 may further comprise a plurality of leveling feet 26, a plurality of casters 22 and a plurality of accessory members 28. The accessory member 28 may be a substantially flat sheet having a plurality of holes 32 for coupling to at least one of the rail members 12 of the plurality of rail members 12, such as a shelf, a bracket or any other desired shape such as a rod and the like.

Referring now to FIG. 10, a perspective view of a frame assembly 400a is shown having the plurality of corner connecters 10 of FIG. 9, the plurality of rail members 12 of FIG. 9, the plurality of reinforcing members 24 of FIG. 9 coupled to a portion of the plurality of rail members 12, and each one of four casters 22 of the plurality of casters 22 of FIG. 9 coupled to each one of four corner connectors 10 of the plurality of corner connectors 10. Specifically, the frame assembly 400a is constructed from the frame kit 400 of FIG. 9 and the frame assembly 400a comprises at least one reinforcing member 24 for coupling to two of the rail members 12 thereby providing further structural rigidity for the frame assembly 400a, the at least one reinforcing member 24 located in the at least one container 20. It will be appreciated that any one of the frame kits 100, 200 and 300 and the corresponding frame assemblies 100a, 200a and 300a may comprise the at least one reinforcing member 24. The frame assembly 400a comprises at least eight corner connectors 10 of the plurality of corner connectors 10 and the plurality of fasteners 16. In a preferred embodiment at least ninety-six fasteners are used, although it is understood that less than this number of fasteners may also be effective.

It is understood that the frame assembly 400a may be sized as required by a user of the frame assembly 400a.

STATEMENT OF METHOD FOR ASSEMBLING A FRAME KIT

A method for assembling a frame kit such as 100a, 200a, 300a and 400a comprises the steps of providing a plurality of rail members 12, each one of the rail members 12 having a plurality of holes 32; providing a plurality of corner connectors 10, each one of the plurality of corner connectors 10 including a base member 30 having a plurality of holes 32 and a reinforcing rib 34a coupled to the base member 30, a pair of leg members 36, each having a plurality of holes 32, each one of the pair of leg members 36 including a reinforcing rib 34b, 34c coupled to each one of the pair of leg members 36, a first leg member 36a of the pair of leg members 36 substantially perpendicular to a second leg member 36b of the pair of leg members 36, each one of the pair of leg members 36 substantially perpendicular to the base member 30, a portion of the base member 30 and a portion of the first leg member 36a of the pair of leg members 36 having a first inner slot 38a, a portion of the base member 30 and a portion of the second leg member 36b of the pair of leg members 36 having a second inner slot 38b, a portion of the first leg member 36a and a portion of the second leg member 36b having a third inner slot 38c, and a portion of the base member 30 including a rail stop 40 adjacent to a portion of each one of the pair of leg members 36; providing the first inner slot 38a of each one of the plurality of corner connectors 10 receiving one end of a first rail member 12 of the plurality of rail members 12, the second inner slot 38b of each one of the plurality of corner connectors 10 receiving one end of a second rail member 12 of the plurality of rail members 12 and the third inner slot 38c of each one of the plurality of corner connectors 10 receiving one end of a third rail member 12 of the plurality of rail members 12, the rail stop 40 preventing contact of the one end of the first rail member 12 with both the one end of the second rail member 12 and the one end of the third rail member 12; providing a plurality of fasteners 16 adapted to selectively couple each one of the plurality of rail members 12 to the base member 30 and to each one of the pair of leg members 36 of each one of the plurality of corner connectors 10 thereby providing at least a portion of at least one frame assembly 100a, 200a, 300a and 400a; providing at least one container 20; and locating the plurality of corner members 10, the plurality of rail members 12 and the plurality of fasteners 16 in the at least one container 20 thereby providing the frame kit 100, 200, 300 and 400 in preparation for constructing the at least one frame assembly 100a, 200a, 300a and 400a. The method further comprises the steps of providing at least one of a plurality of leveling feet 26, a plurality of casters 22 and a plurality of accessory members 28; and locating the at least one of a plurality of leveling feet 26, the plurality of casters 22 and the plurality of accessory members 28 in the at least one container 20 of the frame kit 100, 200, 300 and 400 thereby extending the usability of the at least one frame assembly 100a, 200a, 300a and 400a. The method further comprises the steps of providing at least one reinforcing member 24 for coupling to two of the rail members 12 thereby providing further structural rigidity for the frame assembly 100a, 200a, 300a and 400a; and locating the at least one reinforcing member 24 in the at least one container 20 of the frame kit 100, 200, 300 and 400.

A method for constructing a frame assembly 100a, 200a, 300a and 400a from a frame kit 100, 200, 300 and 400 further comprises the steps of unpacking the plurality of corner members 10, the plurality of rail members 12, the plurality of fasteners 16 and one set of instructions 18 from the at least one container 20; and constructing the at least one frame assembly 100a, 200a, 300a and 400a according to the at least one set of instructions 18. It is understood that at least one of a plurality of leveling feet 26, a plurality of casters 22, a plurality of accessory members 28 and a plurality of reinforcing members 24 may also be unpacked from the at least one container 20.

While the invention has been particularly shown and described with reference to preferred embodiments thereof, it will be understood by those skilled in the art that the foregoing and other changes in form and details may be made therein without departing from the spirit and scope of the invention. In particular, a frame kit may further comprise a first frame assembly comprising a first set of the plurality of corner members 10, the plurality of rail members 12 and the plurality of fasteners 16 located in the at least one container 20 and a second frame assembly comprising a second set of the plurality of corner members 10, the plurality of rail members 12 and the plurality of fasteners 16 located in at least a second container 20, each one of a co-planar set of the plurality of corner members 10 of the first frame assembly being coupled to each one of a co-planar set of the plurality of corner members 10 of the second frame assembly may provide a multiple frame assembly. The first frame assembly and the second frame assembly may be any of the frame assemblies 100a, 200a, 300a and 400a described above. It is understood that more than two of the above described frame assemblies may be coupled to provide a multiple frame assembly. It is further understood that multiple containers may be provided for each one of a plurality of corner connectors 10, a plurality of rail members 12 and the at least one of a plurality of leveling feet 26, a plurality of casters 22 and a plurality of rib members 24.

What is claimed is:

1. A frame kit comprising, in combination:
   a plurality of rail members, each one of said rail members having a plurality of holes;
   a plurality of corner connectors, each one of said plurality of corner connectors including a base member having a plurality of holes and a reinforcing rib coupled to said base member, a pair of leg members, each having a plurality of holes, each one of said pair of leg members including a reinforcing rib coupled to each one of said pair of leg members, a first leg member of said pair of leg members substantially perpendicular to a second leg member of said pair of leg members, each one of said pair of leg members substantially perpendicular to said base member, a portion of said base member and a portion of said first leg member of said pair of leg members having a first inner slot, a portion of said base member and a portion of said second leg member of said pair of leg members having a second inner slot, a portion of said first leg member and a portion of said second leg member having a third inner slot, and a portion of said base member including a rail stop adjacent to a portion of each one of said pair of leg members;
   said first inner slot of each one of said plurality of corner connectors receiving one end of a first rail member of said plurality of rail members, said second inner slot of each one of said plurality of corner connectors receiving one end of a second rail member of said plurality of rail members and said third inner slot of each one of said plurality of corner connectors receiving one end of a third rail member of said plurality of rail members, said rail stop preventing contact of said one end of said first rail member with both said one end of said second rail member and said one end of said third rail member;

a plurality of fasteners adapted to selectively couple each one of said plurality of rail members to said base member and to each one of said pair of leg members of each one of said plurality of corner connectors thereby providing at least a portion of a frame assembly; and at least one container, said plurality of corner members, said plurality of rail members and said plurality of fasteners located in said at least one container thereby providing the frame kit.

2. The frame kit according to claim 1 further comprising at least one of a plurality of leveling feet, a plurality of casters and a plurality of accessory members located in said at least one container.

3. The frame kit according to claim 1 further comprising at least one reinforcing member for coupling to two of said rail members thereby providing further structural rigidity for said frame assembly, said at least one reinforcing member located in said at least one container.

4. The frame kit according to claim 1 wherein said base member of each one of said plurality of corner connectors includes a reinforcing rib coupled to a portion of said base member and each one of said pair of leg members of each one of said plurality of corner connectors includes a reinforcing rib coupled to a portion of each one of said pair of leg members thereby strengthening each one of said plurality of corner connectors of said frame assembly.

5. The frame kit according to claim 1 wherein said frame assembly comprises at least eight corner connectors of said plurality of corner connectors, at least twelve rail members of said plurality of rail members and at least ninety-six fasteners of said plurality of fasteners.

6. The frame kit according to claim 5 wherein each one of said at least twelve rail members of said plurality of rail members having the same length thereby providing a cube shaped frame assembly.

7. The frame kit according to claim 5 wherein each one of a first set of four rail members of said twelve rail members having the same length and each one of a second set of eight rail members of said twelve rail members having the same length, said first set of said twelve rail members being of different length to said second set of said twelve rail members thereby providing a rectangular prismatic shaped frame assembly.

8. The frame kit according to claim 5 wherein each one of a first set of four rail members of said twelve rail members having the same length, each one of a second set of four rail members of said twelve rail members having the same length and a third set of four rail members of said twelve rail members having the same length, said first set of said twelve rail members being of different length to said second set of said twelve rail members, and said third set of said twelve rail members being of different length to both said first set of four rail members and said second set of four rail members thereby providing a rectangular prismatic shaped frame assembly.

9. The frame kit according to claim 1 wherein said base member of each one of said plurality of corner connectors having at least one threaded hole and said base member of each one of said plurality of corner connectors is selectively coupled to one of a leveling foot, a caster and an accessory member.

10. The frame kit according to claim 1 wherein each one of said plurality of corner connectors comprises a material selected from the group consisting of a metal, a plastic and a fiber reinforced plastic.

11. The frame kit according to claim 10 wherein said metal is aluminum.

12. The frame kit according to claim 1 wherein both said plurality of holes of said base member and said plurality of holes of said pair of leg members of each one of said plurality of corner connectors has a counter sunk shape to accommodate a head portion of each one of said plurality of fasteners.

13. The frame kit according to claim 1 wherein each one of said plurality of rail members is substantially L-shaped and thereby adapted to conform to each one of said inner slots of each one of said plurality of corner connectors.

14. The frame kit according to claim 1 wherein a first frame assembly comprises a first set of said plurality of corner members, said plurality of rail members and said plurality of fasteners located in said at least one container and a second frame assembly comprises a second set of said plurality of corner members, said plurality of rail members and said plurality of fasteners located in at least a second container, each one of a co-planar set of said plurality of corner members of said first frame assembly coupled to each one of a co-planar set of said plurality of corner members of said second frame assembly providing a multiple frame assembly.

15. A method for assembling a frame kit comprising the steps of:

providing a plurality of rail members, each one of said rail members having a plurality of holes;

providing a plurality of corner connectors, each one of said plurality of corner connectors including a base member having a plurality of holes and a reinforcing rib coupled to said base member, a pair of leg members, each having a plurality of holes, each one of said pair of leg members including a reinforcing rib coupled to each one of said pair of leg members, a first leg member of said pair of leg members substantially perpendicular to a second leg member of said pair of leg members, each one of said pair of leg members substantially perpendicular to said base member, a portion of said base member and a portion of said first leg member of said pair of leg members having a first inner slot, a portion of said base member and a portion of said second leg member of said pair of leg members having a second inner slot, a portion of said first leg member and a portion of said second leg member having a third inner slot, and a portion of said base member including a rail stop adjacent to a portion of each one of said pair of leg members;

providing said first inner slot of each one of said plurality of corner connectors receiving one end of a first rail member of said plurality of rail members, said second inner slot of each one of said plurality of corner connectors receiving one end of a second rail member of said plurality of rail members and said third inner slot of each one of said plurality of corner connectors receiving one end of a third rail member of said plurality of rail members, said rail stop preventing contact of said one end of said first rail member with both said one end of said second rail member and said one end of said third rail member;

providing a plurality of fasteners adapted to selectively couple each one of said plurality of rail members to said base member and to each one of said pair of leg members of each one of said plurality of corner connectors thereby providing at least a portion of at least one frame assembly;

providing at least one container; and locating said plurality of corner members, said plurality of rail members and said plurality of fasteners in said at least one container thereby providing said frame kit in preparation for constructing said at least one frame assembly.

16. The method according to claim 15 further comprising the steps of:

providing at least one of a plurality of leveling feet, a plurality of casters and a plurality of accessory members; and locating said at least one of a plurality of leveling feet, said plurality of casters and said plurality of accessory members in said at least one container of said frame kit thereby extending the usability of said at least one frame assembly.

17. The method according to claim 15 further comprising the steps of:

providing at least one reinforcing member for coupling to two of said rail members thereby providing further structural rigidity for said frame assembly; and locating said at least one reinforcing member in said at least one container of said frame kit.

18. A method for constructing a frame assembly from a frame kit comprising the steps of:

providing said frame kit comprising a plurality of rail members, each one of said rail members having a plurality of holes;

providing said frame kit further comprising a plurality of corner connectors, each one of said plurality of corner connectors including a base member having a plurality of holes and a reinforcing rib coupled to said base member, a pair of leg members, each having a plurality of holes, each one of said pair of leg members including a reinforcing rib coupled to each one of said pair of leg members, a first leg member of said pair of leg members substantially perpendicular to a second leg member of said pair of leg members, each one of said pair of leg members substantially perpendicular to said base member, a portion of said base member and a portion of said first leg member of said pair of leg members having a first inner slot, a portion of said base member and a portion of said second leg member of said pair of leg members having a second inner slot, a portion of said first leg member and a portion of said second leg member having a third inner slot, and a portion of said base member including a rail stop adjacent to a portion of each one of said pair of leg members;

providing said frame kit further comprising said first inner slot of each one of said plurality of corner connectors receiving one end of a first rail member of said plurality of rail members, said second inner slot of each one of said plurality of corner connectors receiving one end of a second rail member of said plurality of rail members and said third inner slot of each one of said plurality of corner connectors receiving one end of a third rail member of said plurality of rail members, said rail stop preventing contact of said one end of said first rail member with both said one end of said second rail member and said one end of said third rail member;

providing said frame kit further comprising a plurality of fasteners adapted to selectively couple each one of said plurality of rail members to said base member and to each one of said pair of leg members of each one of said plurality of corner connectors thereby providing at least a portion of at least one frame assembly;

providing said frame kit comprising at least one container housing said plurality of corner members, said plurality of rail members, said plurality of fasteners and at least one set of instructions for constructing said at least one frame assembly;

unpacking said plurality of corner members, said plurality of rail members, said plurality of fasteners and said one set of instructions from said at least one container; and constructing said at least one frame assembly according to said at least one set of instructions.

* * * * *